United States Patent
Siegel

[11] 3,841,097
[45] Oct. 15, 1974

[54] DIFFERENTIAL TEMPERATURE FLUID MOTOR

[76] Inventor: Israel Siegel, 351 W. 71st St., New York, N.Y. 10023

[22] Filed: Feb. 22, 1973

[21] Appl. No.: 334,974

[52] U.S. Cl................ 60/517, 60/521, 60/522, 91/4
[51] Int. Cl............................. F02g 1/04
[58] Field of Search........ 60/22, 25, 496, 517; 91/4; 137/209

[56] References Cited
UNITED STATES PATENTS

| | | | |
|---|---|---|---|
| 685,269 | 10/1901 | Fulton.................... | 60/25 |
| 999,579 | 8/1911 | Mecham................. | 60/22 |
| 2,241,620 | 5/1941 | Shoeld.................... | 60/25 |
| 3,097,659 | 7/1963 | Calvert................... | 137/209 |
| 3,100,965 | 8/1963 | Blackburn............... | 91/4 |
| 3,285,001 | 11/1966 | Turnblade............... | 60/25 |
| 3,732,040 | 5/1973 | Low et al................ | 60/25 |

Primary Examiner—Edgar W. Geoghegan
Assistant Examiner—H. Burks, Sr.
Attorney, Agent, or Firm—Philip G. Hilbert

[57] ABSTRACT

This disclosure is directed to a differential temperature fluid motor having a warm chamber containing a small supply of activating fluid connected in communication with a cold chamber adapted for cooling the activating fluid and for obtaining a mechanical advantage from a small supply of rising activating fluid. By utilizing a temperature differential between the cold and warm chambers to obtain a vapor pressure differential, a flow of activating fluid is cycled to and from the two chambers for concentration of buoyant force and imparting relative movement in the cold chamber and translation of said movement into useful work.

20 Claims, 5 Drawing Figures

DIFFERENTIAL TEMPERATURE FLUID MOTOR

OBJECTS

An object of this invention is to provide a motor in which relatively low temperature differences between two volumetric spaces is translated into useful work.

Another object of this invention is to provide a motor which can be readily operated at relative low temperatures.

Another object of this invention is to provide a motor utilizing the energy inherent in liquid evaporation under environmental conditions to provide the temperature differential necessary for the production of useful work.

Another object of this invention is to provide a motor which utilizes the temperature differential between two natural environments, e.g., the atmosphere and a body of water for effecting the production of useful work.

Another object of this invention is to provide a buoyant force concentrating machine in which the energy of relatively small bodies of rising fluid can be utilized for useful work.

BRIEF SUMMARY OF THE INVENTION

This invention is directed to a differential temperature motor consisting of two interconnected chambers sealed from the outside atmosphere. One chamber is a warm chamber adapted to hold a low boiling point fluid under pressure. The other chamber is a cold buoyant-force concentrating chamber adapted for losing heat and obtaining a mechanical advantage from a small body of rising fluids. Essentially, the latter chamber comprises two members adapted for relative movement composed of a container and a body within said container, the container and body being of such relative volumes so as to provide a relatively small volumetric space between the container and body.

A low boiling point fluid, present in warm and buoyant chambers under different temperature and vapor pressures, provides the main force for circulating fluid in interspace between body and its outside container of cold chamber. Means to obtain a temperature differential between warm and cold chambers consists of wetting of the exterior surfaces of cold chamber by water, or by heating warm chamber by an outside heat source, or by keeping warm and cold chambers in environment of different temperatures, e.g., air and water, or by combination of such means. Fluid present under higher vapor pressure in warm chamber will enter cold chamber through conduit connecting fluid phase of the respective chambers and will exert a buoyant force upon moving member of cold chamber.

Means are provided for either upward movement of body (when body is a float) in the cold chamber or downward movement of outside container or lower part of outside container of the cold chamber in response to buoyant force on a fixed body. Springs are provided for the temporary restriction of the movement of the movable member in response to buoyant force until fluid in space between body and container has reached the desired level. Means are provided to transmit the movement of one member which occurs upon the development of sufficient buoyant force to force receiving means.

The moving member of the cold chamber controls a valve which opens and closes in conduit connecting vapor phase of the respective warm and cold chambers. Opening of vapor-phase conduit equalizes vapor pressure in warm chamber and cold chamber and causes fluid rising in the cold chamber to flow back to warm chamber. Pressure upon spring is thus removed and rebound of spring is available for useful work. The cycle is repeated by the valve closing the vapor conduit to allow for the development of new vapor pressures differential between warm and cold chamber.

Figure 1:
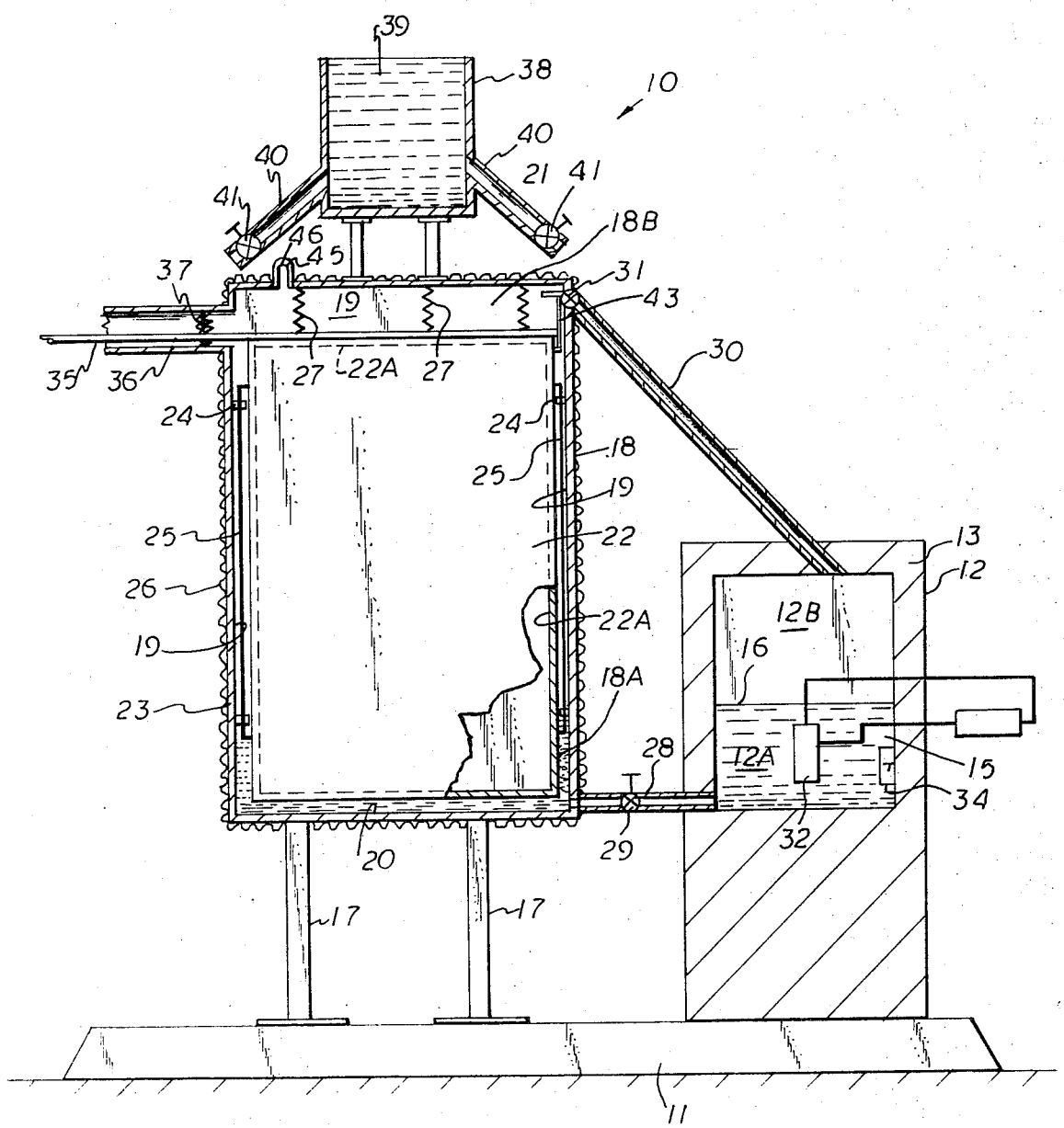
FIG. 1 is a cross-sectional view of a fluid motor apparatus embodying the present invention.

Referring to FIG. 1 there is shown a fluid motor apparatus 10 which embodies the principles of the present invention. A support or frame 11 is provided for supporting thereon an activating fluid chamber or warm chamber 12. In the form of the invention of FIG. 1, warm chamber 12 is provided with an outer coating of thermal insulating material 13 to define a fluid chamber 12 formed to prohibit or minimize any heat loss to the atmosphere. As will be hereinafter described warm chamber 12 is adapted to contain a supply of activating fluid, preferably a liquid 15 having a low boiling point wherein the liquid supply 15 defines a liquid level 16 to define a liquid chamber portion 12A and a vapor chamber portion 12B.

Suitably supported on the base 11 by suitable support structures 17 is a machine float chamber or cold chamber 18. In the illustrated form of the invention the machine or cold chamber 18 is defined as a rectangular chamber having opposed sidewalls 19, a bottom wall 20 and an interconnecting top wall 21.

Disposed within the machine chamber 18 is a float member or body 22. As best seen in FIG. 1, the float or body member 22 comprises a hollow structure arranged to float in the liquid 15. The float or body 22 is sized and shaped so as to have the wall portions 22A thereof slightly spaced from the walls 19 of the float chamber 18. The arrangement is such that the volume of the space 23 between the wall portions of the float 22 and the chamber defines a volume which is very much smaller than the volume of the float 22.

As will be hereinafter described, the float 22 is disposed within the float chamber 18 so as to allow for a relative movement therebetween. Suitable guide means are provided for maintaining the position of the float 22 relative to the float chamber 18 during such relative movement. The guide means may comprise guide rings 24 which may be connected to the external sidewall of the float 22 to ride along guide members or rods 25 connected to the internal wall of the float chamber 18.

The external surface of the float chamber 18 is covered with a wick like material 26 in order to utilize a cooling effect of the float chamber 18 by evaporation as will be hereinafter described. To further enhance the cooling of the float chamber, as will be described, the chamber 18 is preferably formed of good heat conducting material.

As best seen in FIG. 1, a biasing means, e.g., one or more compression springs 27, is interposed between the top 21 of the float chamber 18 and the top 22A of the float or body 22. The arrangement is such that the springs 27 normally exert a spring bias of a predetermined spring force on the float 22 to bias the float 22 toward the bottom wall 20 of the float chamber.

Interconnecting the liquid chamber portion 12A of the warm chamber 12 to the liquid chamber portion 18A of the float or machine chamber 18 is an interconnecting liquid conducting conduit 28. If desired a suitable flow valve 29 may be interposed in the conduit 28 to control the flow of liquid 15 flowing therethrough as will be hereinafter described.

Interconnecting the vapor chamber portion 12B of the actuating or warm chamber 12 and the vapor chamber portion 18B of float or machine chamber 18 is vapor conducting conduit 30. Disposed in the vapor conducting conduit 30 is a valve 31 which is normally closed. The valve 31 is actuated automatically and is operative upon relative movement between the float or body 22 and its chamber 18. The arrangement is such that upward displacement of the float 22 will effect an opening of the valve 31, as will be hereinafter described.

A heating means 32 is provided to heat the liquid supply 15 in chamber 12. In the illustrated embodiment the heater is an electric resistance heater operatively connected in electric circuit to a source of electrical supply, 33, e.g., a battery, a generator or line current. To control the temperature of the activating liquid 15 within chamber 12 a thermostat 34 is provided.

Connected to the springs 27 is a force transmitting member 35 which extends out through an opening 36 formed in the side wall of the cold chamber 18.

It will be readily understood that a suitable sealing diaphragm or flexible wall portion 37 is provided to seal the opening 36 through which the transmitting member 35 extends through the wall portion of the float chamber 18.

The extended end of transmitting member 35 is suitably connected by mechanical linkage (not shown) through which the movement of the spring 27, as will be hereinafter described, is translated into useful work.

Supported on the top of the float chamber 18 is a reservoir tank 38 which is adapted to contain a supply of cooling fluid or liquid 39, as for example, water. Branch conduits 40 are connected to the tank 30 for directing the cooling water 39 into the outer wick coating 26 of the float tank. Suitable valves 41 may be interposed into the respective branch conduits 40 for controlling the flow of cooling water onto the wick coating 26.

The arrangement is such that in operation the liquid 15 in chamber 12 enters the liquid chamber portion 18A of the float tank 18 through the connecting conduit 28 so that the float 22 normally floats upon the liquid in the bottom of the container 18. As the float is confined by the float guides 24, 25, the float 22 is permitted to only move in an up and down manner; its horizontal displacement being virtually limited. Thus the up and down movement of the float 22 during operation of the apparatus is controlled by the guide members 25.

As the float 22 is displaced up and down relative to the float chamber 18, the spring 27 and transmission member 35 will move up and down therewith. Attached to the extended end of the transmission member 35, not shown, there is provided suitable linkage means for translating the rhythmic up and down relative movement between the float 22 and its chamber 18 into either a rotary or linear motion required to effect the production of useful work.

As shown in FIG. 1, the valve 31 interposed in the vapor conducting conduit 30 is arranged to be actuated by a valve actuator 43 which is connected to a wall portion of the float 22 and is carried thereby. The arrangement is such that as the float 22 reaches its upper limit of its relative movement, the actuator 43 will effect an actuation of the associated valve 31 to open the vapor chamber portion 18B of the float chamber into communication with the vapor chamber portion 12B of the activating chamber 12. As the float 22 drops to its normal inoperative position, the valve actuator 43 will effect a closing of the valve 31. The water 39 stored in the reservoir 38 functions to maintain the wick coating 26 of the float tank 18 damp. It will be understood that the water flowing from tank 38 is controlled in a manner so as to wet and maintain the wick coating damp in a predetermined manner.

Chambers 12 and 18 though interconnected are sealed from the outside atmosphere to prevent loss of vapor of activated fluid 15. Formed in the top portion 21 of the float chamber 18 is a flexible membrane or wall portion 45 to define an expansion chamber 46 for the air which is displaced as the liquid level 46 in the liquid portion 18A rises.

The operation of the fluid motor apparatus 10, as described, is as follows:

With the valve 31 closed, the liquid 15 in the warm chamber 12, which is preferably a liquid having a low boiling point, is heated, as for example, by energizing the heating coil 32. Upon such heating of liquid 15 in chamber 12, a vapor pressure is generated in the space 12B above the liquid level 16 which exceeds the vapor pressure acting upon the liquid level 47 in float chamber 18. Due to this increased vapor pressure in chamber 12, liquid therein will therefore tend to flow through the liquid conducting conduit 28 and enter the float chamber 18. This causes the liquid level 47 in the interspace 23 between the float 22 and the float chamber 18, to rise. As this occurs the float 22 will be subjected to a buoyant force causing it to rise. However, due to the biasing action of springs 27 acting on the float 22, the float 22 is prevented from rising until a level of the liquid in the interspace 23 is reached to provide the necessary buoyant forces operating on the float 22 to overcome the bias of springs 27 acting on the float 22. The air being displaced by the rising liquid level 47 in the float tank 18 seeks the expansion chamber 46, expanding the flexible diaphragm 45 as the displaced air inflates the expansion chamber. Thus when the sufficient buoyant force has been developed on the float 22 to a point where it overcomes the bias exerted by springs 27, the float will rise. On rising, and as the float approaches its upper limit of travel, the valve actuator 43 will effect an opening of valve 31 causing the vapor chamber portion 18B of the float chamber 18 to be placed into communication with the vapor pressure portion 12B of the associated fluid chamber 12. When this occurs, an equalization of vapor pressure within the two chambers 12 and 18 is achieved. Upon the equalization of the vapor pressure between chambers 12 and 18, the liquid in the float chamber 28 will reenter or flow back to the liquid chamber portion 12A of chamber 12. The buoyant forces, overcoming the bias of spring 27 are thereby released and the spring 27 acting on transmission member 35 will cause the transmission member 35 to be moved downward. In a complete cycle of operation, the movement of the float 22 up and down will effect a corresponding movement of the transmission member 35. The reciprocating movement of the transmission member 35 through appropriate linkage is readily translated into a rotary or linear movement to do useful work. As the float tank 18 is formed of good conducting material, and as it is coated by a wick-like coating 26, the evaporation occurring externally of the float tank 18 further functions as a cooling medium for the vapor within the float tank. Upon the cooling, the vapor in chamber 18 condenses to form the liquid and vapor pressure in cold chamber is diminished. Upon closing of the valve 31 by the downward movement of the float 22, the vapor withing container 12 is again generated whereby the increase in vapor pressure agains forces the liquid to flow from the chamber 12 to chamber 18 to thus repeat the cycle of operation described. By continuing the cycling of the liquid between the chamber 12 and 18, the relative movement between the float 22 and its chamber 18 is translated through member 35 and associated linkage (not shown) to do useful work.

The following will provide a numerical example in FIG. 1 of the mechanical advantage that can be obtained by the operation described. It is understood that the dimensions cited may be varied to suit the specific needs of the users, and the numerical example herein given is for illustrative purposes only.

The inside dimensions of the cold chamber 18 are 201 cm in width, 201 cm in length, and 150 cm in height. The dimensions of float 22 are 200 cm in width, 200 cm in length, and 110 cm in height. Interspace 23 between sidewalls 22A of float 22 and sidewalls 19 of container 18 is 0.5 cm. The height of fluid in chamber 18 when vapor pressure in cold and warm chambers is equal (and before float 22 is placed inside chamber 18) is 1 cm. This requires 40.4 liter of fluid in chamber 18. Float 22 when placed inside chamber 18 floats upon the fluid in chamber 18. Float 22 will sink in said fluid until the buoyant force is equal to the weight of the float 22. The weight of float 22 is 20 Kg. It will be assumed that fluid in cold chamber has the specific gravity of water so that each liter of water weighs approximately 1 kg. The buoyant forces acting upon float 18 will be equal to 20.2 kg when fluid in interspace 23 reaches a height of 0.5 cm. This will occur when float 22 will displace about 0.2 liter of fluid in chamber 18. When fluid enters from warm to cold chamber, it will accumulate in interspace 23.

Spring 27 prevents float 22 from rising in response to the entering fluid so that the level of fluid rises in interspace 23. This temporary restriction of upward movement of float 22 is essential for the development of buoyant force, since if float 22 immediately rises in response to entering fluid, the buoyant force developed would only slightly exceed the weight of the float. If total resistance of spring 27 is equal to 4,000 Kg, the float 22 will not rise until buoyant force exceeds 4,000 Kg. This would occur when fluid in interspace 23 has exceeded a height of 100 cm. The volume of fluid required to fill interspace 23 to a level exceeding 100 cm is a volume exceeding 40.2 liter. At this point the float tends to rise. An additional 40.2 liter of fluid will have to enter the cold chamber for each 1 cm upward movement of the float against 4,000 Kg force of spring 27. Thus movement of the float over the distance of the 1 cm against the force of 4,000 Kg will be caused by raising 80.4 liter of fluid to a height of 100–101 cm. Each additional upward movement of 1 cm of the float against resistance of 4,000 Kg. will require the transfer of 40.2 liter to the space between float and container. Thus, a mechanical advantage of 4,000/40.2 or about 100 can be obtained. The mechanical advantage is thus determined by the ratios of the volume of float 22 and volume of interspace 23 and may be varied according to the mechanical advantage desired.

Figure 2:
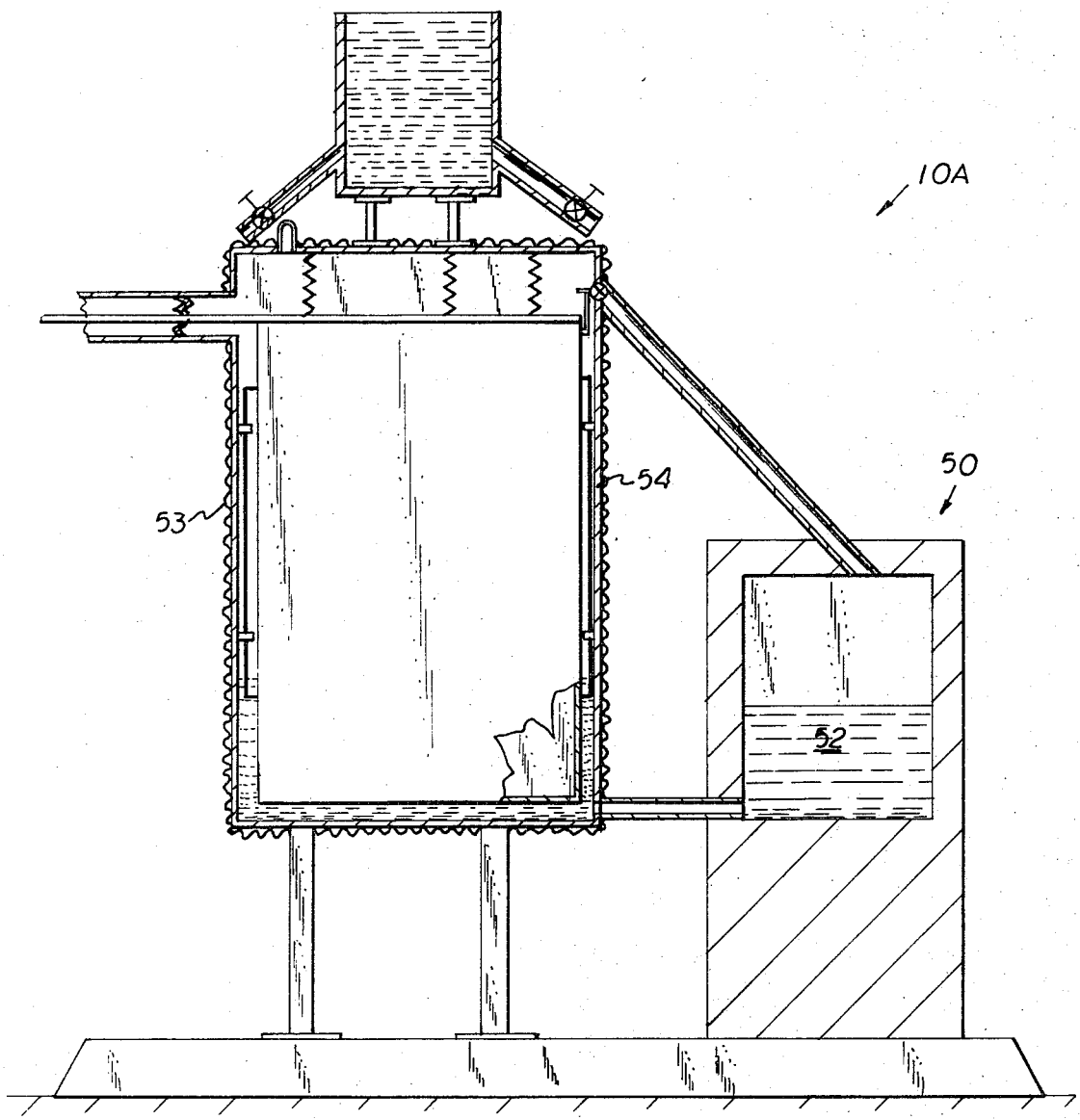
FIG. 2 is a cross-sectional view of a modified form of the invention.

FIG. 2 illustrates a modified form of the invention. In this form of the invention the construction of the differential temperature motor apparatus 10A is similar to that described in FIG. 1 except that the fluid chamber 50 is not provided with any heating coil or heat power source or thermostat. In the arrangement of FIG. 2, the differences in temperature of the liquid 52 between warm chamber 50 and cold machine chamber 54 is effected by the machine chamber 54 being cooled by evaporation of water on its surface. This is attained by the controlled wetting of the wick covering 53 about the machine or float chamber 54 as hereinbefore described. It will be noted that the normal evaporation of water upon the wetting of the cold chamber 54 is solely utilized to effect the operation of the fluid motor. All other components and operation of the device are similar to those described for FIG. 1.

While the embodiment of FIG. 2 illustrates the float or cold chamber 54 being cooled by evaporation, it will be understood that other means may be provided for maintaining chamber 54 colder than the warm chamber 50. Cooling of the cold chamber 54 may be alternately achieved by providing chamber 54 with a cold water jacket, i.e., by immersing or surrounding chamber 54 with very cold liquid, e.g., ice water, or other sub-freezing fluid. This arrangement would be ideally suited in areas in which ice is freely available and the atmospheric temperature is above freezing. Thus the differential temperatures can be readily obtained by exposing the warm chamber 50 to the atmospheric temperature and the cold chamber to the colder temperature produced by an ice water jacket; to result in an operation of the fluid motor in a manner hereinbefore described.

Figure 3:
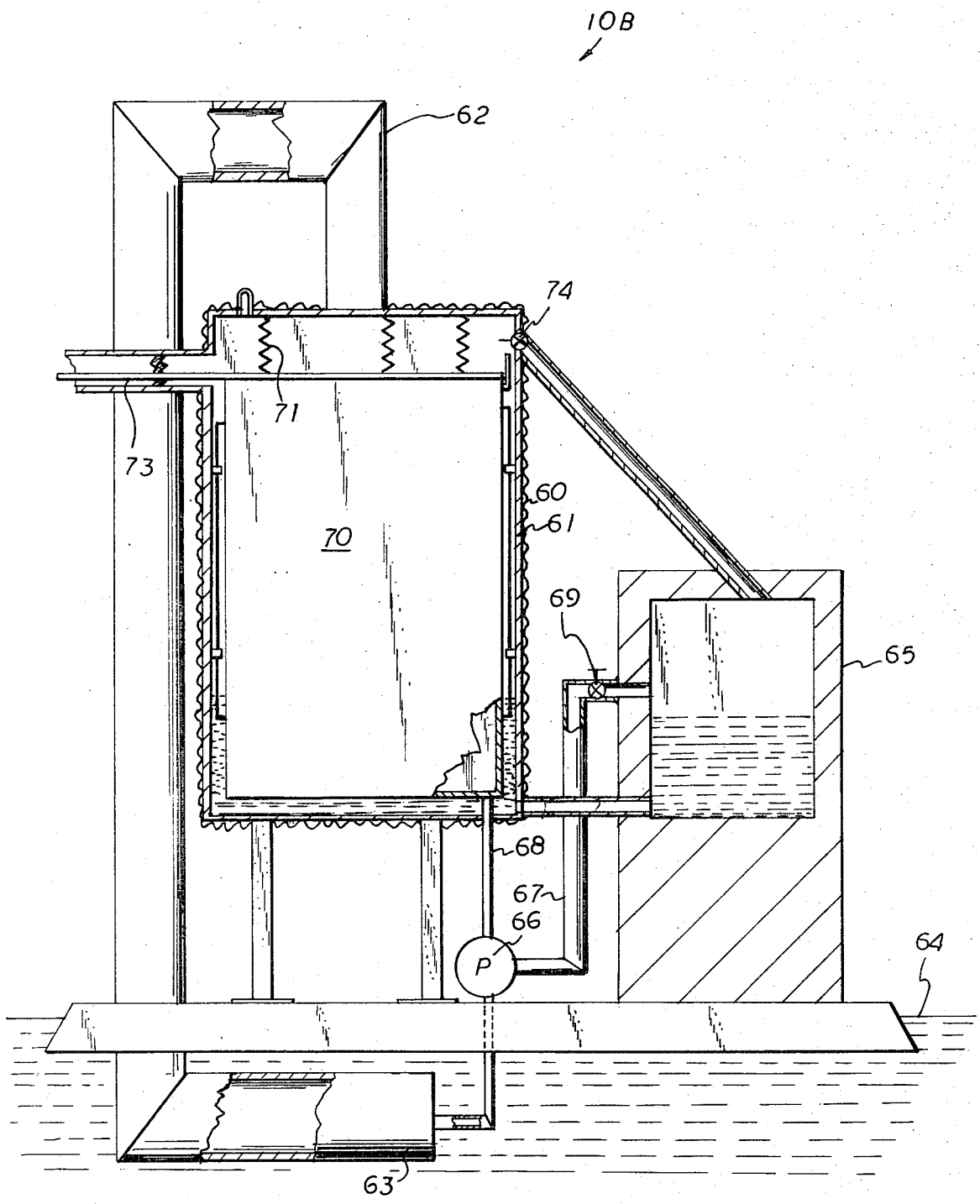
FIG. 3 is a cross sectional view of still another modified form of the invention.

FIG. 3 illustrates another form of the invention adapted to operate in an atmosphere-water environment where the temperature of the water is cooler than that of the atmosphere. In this form of the invention the differential temperature motor apparatus 10B is similar to that described in FIGS. 1 and 2 with the exception that the vapor chamber portion 60 of the machine chamber 61 is extended by a connecting conduit 62 which connects the vapor chamber portion 60 of the machine chamber 61 with a condensation tank 63 adapted to be disposed in a body of water 50, e.g., a lake, a river, pond or the like, which has a water temperature which is cooler than that of the atmosphere. This embodiment is particularly adapted for use under conditions in which the differential temperature apparatus 10B is used in proximity to a large body of water, as for example, on a boat. For this reason a wick covering on the machine chamber 61 may be omitted. Both warm and cold chambers are constructed of materials which are good heat conductors. Thus on days when water temperature is colder than atmospheric temperature, the vapor pressure of the float tank 61, upon equalization of the vapor pressure between chambers 65 and 61 is reduced by the condensation thereof occurring in the condensation tank 63. The condensate therein is then pumped back to the warm chamber 65 by a pump 66 and connecting conduit 67. If desired the pump 66 may be activated by movement of the float through a suitable interconnecting linkage 68. A pressure valve 69 located in conduit 67 will open in response to outside pressure for the pump, but not in response to the vapor pressure forming inside chamber 65.

In the embodiment of FIG. 3, the cycle of operation is similar to that of FIGS. 1 and 2 in that the difference in temperature between warm chamber 65 and cold chamber 61 causes a vapor pressure to develop in chamber 61 resulting in a liquid flow into the cold chamber 61. The rise of liquid level in cold chamber 61 causes the float 70 to rise accordingly upon overcoming the bias of springs 71. As the float 70 reaches its high point and causes a corresponding movement of spring 71 and transmission member 73, the valve 74 is opened to equalize pressure between chambers 65 and 61.

Upon the equalization of the vapor pressure between chambers 65 and 61, the liquid in the float chamber 61 will reenter the liquid chamber portion of chamber 65. The buoyant forces, overcoming the bias of spring 71 are thereby released and the spring 71 acting on the float 70 will force the float 70 downwardly. The downward movement and force exerted by the spring 71 will cause the transmission member 73 to be moved downward likewise. In a complete cycle of operation, the movement of the float 70 up and down will effect a corresponding movement of the transmission member 73. The reciprocating movement of the transmission member 73 through appropriate linkage is readily translated into a rotary or linear movement to do useful work.

Due to the cooling effect resulting from the submerged condensate tank 63, the vapor pressure in cold chamber 61 is reduced at a quicker rate than the vapor pressure in warm chamber 65. As the float 70 descends, the condensate in tank 63 is pumped back to chamber 65 and valve 74 is closed by downward movement of float 70, whereupon the liquid, having a low boiling temperature, will commence vaporizing to build up the vapor pressure in chamber 65. In doing so the cycle of operation is repeated to provide for a periodic or rhythmic displacement of the transmission member 73.

Figure 4:
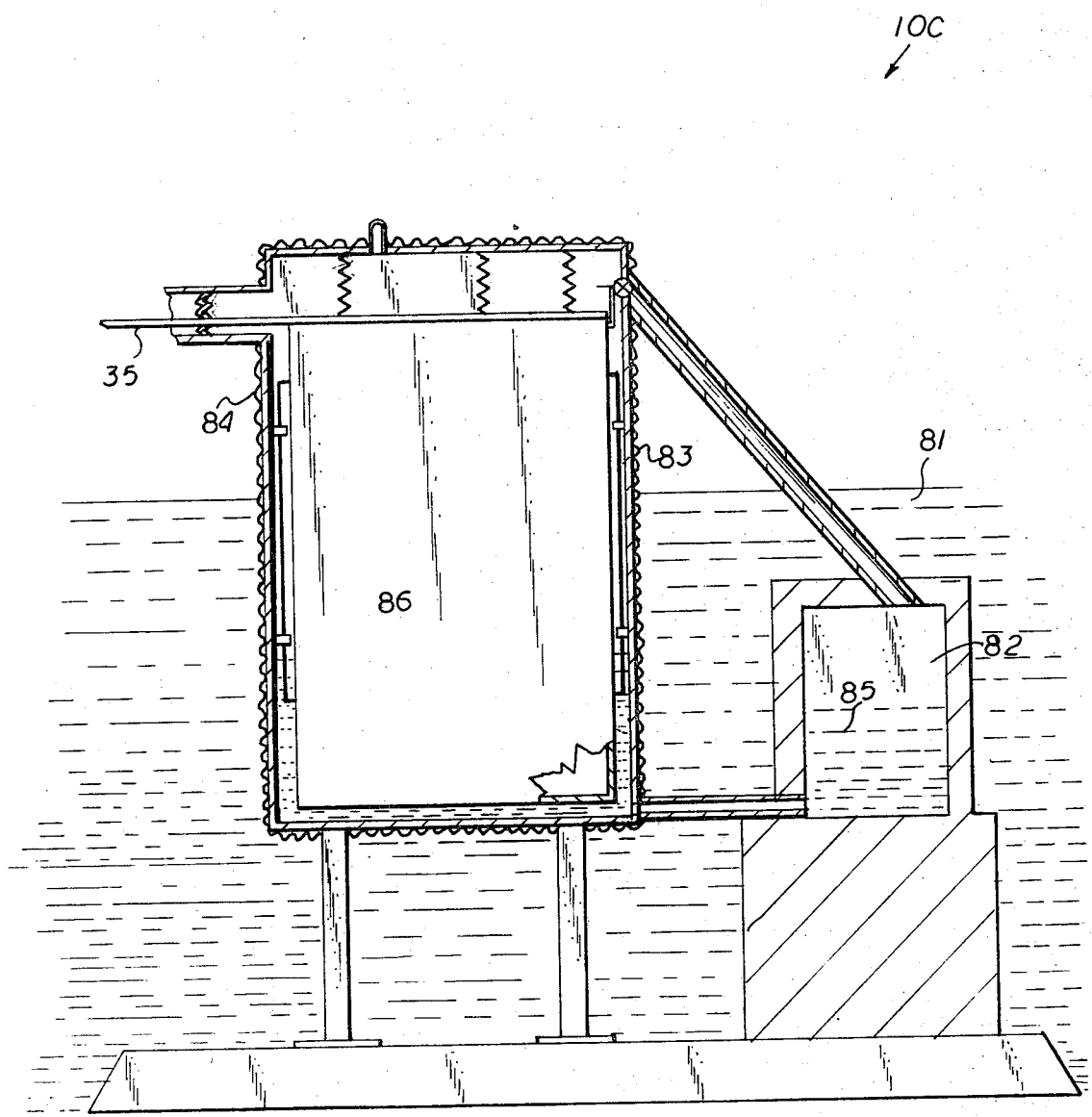
FIG. 4 is a cross-sectional view of still another modified form of the invention.

FIG. 4 illustrates still another modified form of the invention. Except when otherwise specified it is identical to FIG. 2. In this form the apparatus 10C is constructed for use in a body of water 81 which has a temperature which is about equal to atmospheric temperature. The apparatus 10C has its warm chamber 82 completely submerged within the body of water 81; and the warm chamber is constructed of good heat conducting material. The cold chamber 83 is disposed so as to be only partly submerged in the body of water 81. However, due to the wick coating 84 covering the same, the entire surface of the float chamber 83 is wetted by the capillary action of the wick coating 84 and cooled by the evaporation of the water therefrom. The evaporation of the water from the wick coating 84 tends to maintain the cold chamber 83 at a temperature lower than that of warm chamber 82. Consequently, as the temperature of warm chamber 82 is greater then that of cold chamber 83, vapor pressure in chamber 82 will cause the liquid 85 to flow into cold chamber 83 and raise the liquid level therein. In doing so, the float 86 is raised with the resultant sequence of events hereinbefore described.

It will be understood, that in the alternative, the structure of FIG. 3 can also be made to function in an environment in which the atmospheric air is colder than the temperature of the surrounding water. This is readily attained by maintaining the cold chamber submerged in the warmer water and connecting the vapor phase of the cold chamber to a condensor which extends into the colder atmosphere. Such condensor requires a relatively large surface area to effect the required condensation of the vapor in the vapor phase of the cold chamber. It is understood that similar vapor receivers to heat vapor portions of warm chambers may be extended from the vapor phase of the warm chambers into relatively warm environments.

Figure 5:
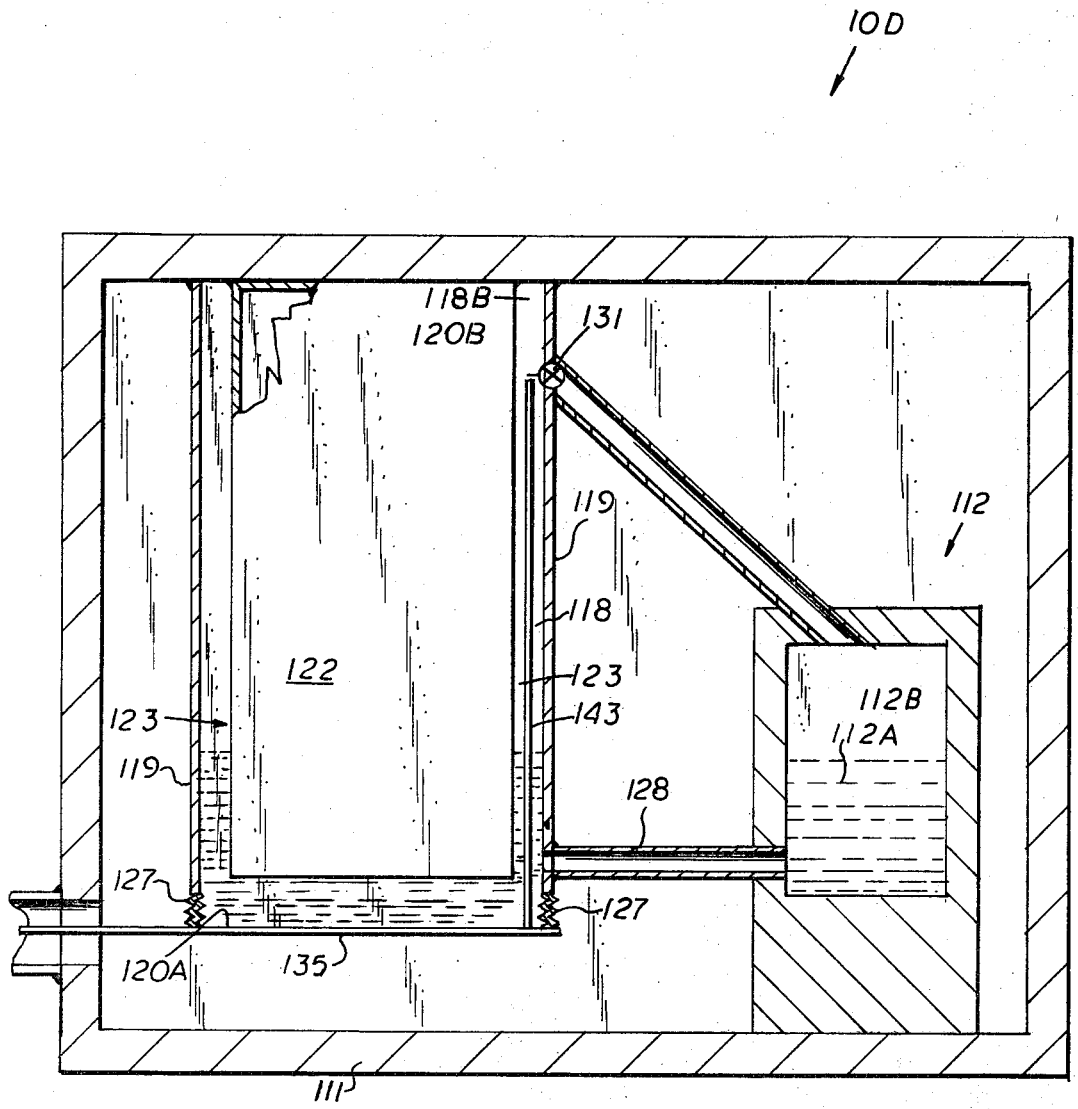
FIG. 5 is a cross sectional view of still another modified form of the invention.

FIG. 5 illustrates another form of the invention indicated at 10D. It is similar to FIG. 1 except when otherwise stated. In this form of the invention, the cold machine chamber 118 is modified to allow the downward movement of bottom wall 120A of chamber 118 in response to buoyant force instead of upward movement float 122. Thus, a buoyant force is exerted without the utilization of a float. To that end, frame 111 is in a form of a rectangle and supports warm chamber 112 and cold chamber 118. Chamber 118 is attached to upper portion of frame 111 so as to allow room for downward movement of lower wall 120A of cold machine chamber 118. Body 122 within container 118 is immovably attached to upper wall 120B of container 118. Bottom wall 120A of container 118 is movably attached to sidewalls 119 of container 118 by imperforate expansion means, e.g., a bellows construction whereby the inherent resiliency of the bellows construction functions as a tension spring. The arrangement is such that bellows normally exert a spring bias of a predetermined spring force to keep bottom wall 120A in upward close position to outsidewalls 119. Connected to outside of bottom wall 120A is a force transmitting member 135. Attached to the extended end of the transmission member 135, there is provided suitable linkage means (not shown) for translating the rhythmic up and down relative movement between the body 122 and the bottom wall 120A of the chamber 118 into either a rotary or linear motion as required to effect the production of useful work.

Valve 131 is similar to that of FIG. 1 except that it is arranged to be actuated by a valve actuator 143 which is connected to the lower wall 120A of chamber 118. The arrangement is such that, as lower wall 120A moves down and reaches its lower limit of its relative movement, the actuator 143 will operate the associated valve 131 to open the vapor portion of the cold chamber 118 into communication with the vapor portion of the warm chamber 112. As the lower wall 120A rises to its normal position and reaches its upper limit of travel, the valve actuater 143 will effect a closing of the valve 131.

The operation of the motor is as follows: With valve 131 closed, and increased vapor pressure in chamber 112 because of higher temperature in warm chamber 112 than in cold chamber 118, liquid in warm chamber 112 will flow through conduit 128 and enter the cold chamber 118. As this occurs, bottom wall 120A will be subjected to pressure exerted by weight of entering fluid. If bottom wall 120A were not prevented from moving, the force acting upon bottom wall 120A will not exceed the weight of entering fluid. However, due to resistance of bellows 127 temporarily preventing downward movement of wall 120A, fluid will enter cold chamber 118 and accumulate in interspace 123 between sidewall of container 118 and body 122.

The buoyant force will, thus, greatly exceed the weight of the fluid in interspace 123 since it will be equal to the volume of fluid which can fill the volume of the body which is immersed in the fluid. The developing buoyant force will exert upward pressure upon body 122 and downward pressure upon lower wall 120A of container 118 when the water in the interspace reaches a predetermined level. Since body 122 is immovable, lower wall 120A will move downward in response to buoyant force when it exceed the resistance of the bellows 127. Thus, when the sufficient buoyant force has been developed to a point where it overcomes the resistance by bellows 127, bottom wall 120A will move down. On moving down, and as the wall 120A approaches its lower limit of travel, the valve actuator 143 will affect an opening of valve 131 causing the vapor chamber portion 118B of the cold machine chamber 118 to be placed into communication with the vapor pressure portion 112B of the associated warm chamber 112. When this occurs, an equalization of vapor pressure within the two chambers 112 and 118 is achieved. Upon the equalization of the vapor pressure between chambers 112 and 118, the liquid in the cold chamber 118 will re-enter the liquid chamber portion 112A of chamber 112 due to the height of the liquid in the interspace 123. The buoyant forces, overcoming the bias of bellows 127, are thereby released and bellows 127 acting upon lower wall 120A of outside chamber 118 will cause 120A to move upward. This will cause transmission member 135 to move upward. Upward movement of lower wall 120A will close valve 131. Upon cooling, the vapor in cold chamber 118 condenses to form a liquid; differential vapor pressure is again generated by higher temperature in warm chamber 112 whereby the increase in vapor pressure again forces the liquid to flow from warm chamber 112 to cold chamber 118 thus repeating the cycle of the operation described. By continuing cycling of the liquid between chambers 112 and 118, the relative movement between the float 122 and its chamber bottom wall 120A is translated through member 135 and associated linkage (not shown) to do useful work.

While this invention has been described with reference to particular embodiments thereof it will be readily appreciated and understood that variations and modifications of the invention may be made without departing from the spirit or scope thereof.

What is claimed is:

1. A differential temperature fluid motor comprising a warm chamber, adapted to keep fluid at relatively warm temperature,
   a cold chamber adapted for obtaining a mechanical advantage from small bodies of rising fluid,
   said cold chamber comprising a container member and a body member disposed within said container member to thereby provide a volumetric space between said body and container,
   said volumetric space comprising relatively small volume, relative to the body,
   means for permitting movement of one of said members thereof in response to a buoyant force,
   means for temporary restraining of movement of said moving member until activating fluid has risen to a predetermined level between container and body, force transmitting means operatively associated with said movable member for translating said movement into useful work,
   a supply of activating fluid in said warm chamber and cold chamber having liquid levels partitioning said warm and cold chambers into a vapor chamber portion and a liquid chamber portion,
   a liquid conducting conduit interconnecting the liquid portions of warm and cold chambers,
   a vapor conducting conduit interconnecting the vapor portions of warm and cold chambers,
   means for cyclic opening and closing said vapor conducting conduit to effect differences in vapor pressure between warm chamber and cold chamber,
   and means for obtaining a temperature differential between warm chamber and cold chamber.

2. The invention as defined in claim 1 wherein said means for cycling opening and closing of vapor conducting conduit comprises a valve means disposed in said vapor conducting conduit for controlling the flow of vapor between said vapor chamber portions, and a valve actuator responsive to the movement of said moving member for actuating said valve means between open and closed position.

3. The invention as defined in claim 1 wherein said means for obtaining a temperature differential includes means for wetting outside surfaces of said cold chamber for effecting a cooling of said cold chamber.

4. The invention as defined in claim 1 wherein said means for obtaining a temperature differential include means for heating said warm chamber.

5. The invention as defined in claim 1 including a valve means disposed in said liquid conducting conduit to control liquid flow therethrough.

6. The invention as defined in claim 1 and including a vapor receiver in communication with vapor portion of said cold chamber,
   said vapor receiver adapted to be submerged in a body of cooling liquid,
   and means for circulating the condensation of said vapor receiver to said warm chamber.

7. The invention as defined in claim 1 wherein said warm chamber is adapted to be submerged in a body of fluid.

8. The invention as defined in claim 6 wherein cold chamber is adapted to be partially submerged in a body of fluid.

9. A differential temperature fluid motor as in claim 1 wherein said chamber comprises a container and a float disposed within said container,
   said float being sized to provide a volumetric space between said float and container,
   said space having a relatively small volume,
   means for permitting movement of at least a portion of said float in response to buoyant force,
   means for temporary restraining said movement until activating fluid has risen to a predetermined height between container and float, and receiving means operatively associated with said float whereby movement of float exerts a force on said receiving means for translating said movement into useful work.

10. A differential temperature motor as in claim 1 wherein said body member is restricted from movement,
means for permitting movement of at least portions of said cold chamber,
means for temporary restraining of movement of said cold chamber portion until activating fluid has risen to a predetermined height between said cold chamber and body member whereby said movement exerts a force on said receiving means for translating said movement into useful work.

11. A buoyant force concentrating apparatus comprising a chamber member and a body member mounted within said chamber member, said body member having a volume less than that of said chamber member to provide a space therebetween,
said members being arranged for relative meovement,
means for circultating a fluid in said space whereby a buoyant effect is exerted on said members to effect the relative movement therebetween,
means for restricting relative movement between said members in response to said buoyant effect until the fluid in space between members has reached a predetermined level,
force receiving means,
one of said members being responsive to said buoyant effect to exert a force to said force receiving means.

12. A buoyant force concentrating apparatus as in claim 11 wherein said body is a float,
means for permitting vertical movement of said float in response to buoyant force,
and means for temporary restraining said movement until activating fluid has risen to a predetermined height between container and float whereby said buoyant force overcomes the force of said restraining means to impart a movement to said float.

13. A buoyant force concentrating machine as in claim 11 wherein said inner body is restricted from movement,
means for permitting vertical movement of at least portions of said outside chamber member,
and means for temporary restraining of said movement until activating fluid has risen to a predetermined height between said chamber member and body member.

14. A buoyant force concentrating apparatus as in claim 11 wherein said circulating means includes a valve system actuated by movement of moving member of the machine.

15. A differential temperature fluid motor as in claim 1 wherein said means for attaining temperature differential consists of environment of two different temperatures.

16. A differential temperature fluid motor as in claim 1 wherein means for obtaining a temperature differential comprises means for cooling cold chamber.

17. A differential temperature fluid motor comprising a chamber and a float disposed within said chamber, said float being sized to provide a volumetric space between said float and chamber, said space having a relatively small volume, means for permitting movement of said float in response to a buoyant force, means for temporarily restraining movement of said float until activating fluid has risen to a predetermined height between container and float whereby movement of said float exerts a force on receiving means therefor for translating said movement into useful work.

18. A differential temperature fluid motor comprising:
a warm chamber adapted to keep fluid at a relatively warm temperature,
a cold chamber adapted to contain a fluid at a colder temperature,
a supply of activating fluid in said warm chamber and cold chamber having liquid levels partitioning said warm and cold chambers into a vapor chamber portion and a liquid chamber portion,
a liquid conducting conduit interconnecting the liquid portions of said warm and cold chambers,
a vapor conducting conduit interconnecting the vapor portions of said warm and cold chamber,
means for cycling the opening and closing of said vapor conducting conduit to effect differences in vapor pressure between said warm and cold chambers,
one of said chambers having a moveable means responding to the differences in vapor pressure between said warm and cold chamber,
a force transmitting means operatively connected to said moveable means for translating movement of said moveable means into useful work,
and means for obtaining a temperature differential between said warm and cold chambers.

19. The invention as defined in claim 11 wherein said means for restricting said relative movement comprises a spring for temporarily restricting said relative movement.

20. The invention as defined in claim 18 and including a valve in said liquid conducting conduit to control the liquid flow between the liquid chamber portions of said cold and warm chambers.

* * * * *